United States Patent [19]

Keith et al.

[11] 4,189,404

[45] Feb. 19, 1980

[54] CATALYST AND PROCESS OF ITS PREPARATION

[75] Inventors: Carl D. Keith, Summit; John J. Mooney, Wyckoff, both of N.J.; Robert E. Kenson, Guilford, Conn.; Daniel L. Bair, Roselle Park, N.J.

[73] Assignee: Engelhard Minerals & Chemicals Corporation, Iselin, N.J.

[21] Appl. No.: 757,145

[22] Filed: Jan. 6, 1977

[51] Int. Cl.$^2$ .................. B01J 21/04; B01J 23/10; B01J 23/40; B01J 23/74

[52] U.S. Cl. .................. 252/462; 252/477 R; 423/213.5

[58] Field of Search ............ 252/465, 466 B, 466 PT, 252/462, 477 R; 423/213.5

[56] References Cited

U.S. PATENT DOCUMENTS

| | | | |
|---|---|---|---|
| 3,741,725 | 6/1973 | Graham | 252/466 PT |
| 3,931,050 | 1/1976 | Asano et al. | 252/466 PT |

FOREIGN PATENT DOCUMENTS 49-128893 12/1974 Japan.

*Primary Examiner*—W. J. Shine

[57] ABSTRACT

Macrosized catalysts suitable for promoting chemical reactions, especially to reduce pollutants in waste gas streams such as automobile exhaust, are described. The catalysts have one or more metal components, especially a platinum group metal component, as a catalytic promoter combined with a high surface area, refractory oxide support on a relatively catalytically-inactive carrier, especially a monolithic carrier which may be of the honeycomb type. An aqueous solution of an alumina precursor is added to the macrosize catalyst to provide protection against poisoning by extraneous materials such as lead, zinc, other metals, sulfur or phosphorus with which the catalysts may come in contact during use.

32 Claims, No Drawings

CATALYST AND PROCESS OF ITS PREPARATION

The present invention relates to macrosize catalytic compositions suitable for promoting chemical reactions, and to methods for preparing such catalysts. More particularly, the invention concerns macrosize compositions having good catalytic activity and increased resistance to poisoning by extraneous materials such as lead, zinc, other metals, sulfur or phosphorus with which the catalysts may come in contact during use. Combating the poisoning effects of one or both of lead and phosphorus is of particular concern. The catalysts contain one or more catalytically-active, promoting metal components combined with a high surface area, refractory oxide support carried on a relatively catalytically-inactive, solid material, especially a monolithic carrier which may be in honeycomb or other form. We have found that the addition of an aqueous solution of an alumina precursor to the macrosize catalysts provides protection against such poisoning without unduly detracting from the activity or other desirable characteristics of the catalysts. Preferably, the promoting metal component of the catalysts contains one or more of the platinum group metals.

The catalytic compositions of the present invention can be employed to promote chemical reactions, particularly oxidation and reduction reactions, for fume, color or odor abatement or for other reasons. These reactions include the oxidation of carbonaceous materials, e.g., carbon monoxide, hydrocarbons, oxygen-containing organic compounds, and the like, to carbon dioxide and water which are relatively innocuous materials from an air pollution standpoint. Advantageously, the catalytic compositions can be used to provide essentially complete oxidation of gaseous effluents containing uncombusted or partially combusted carbonaceous fuel components such as carbon monoxide, hydrocarbons, or intermediate oxidation products composed primarily of carbon, hydrogen and oxygen. The effluents may be of various types such as internal combustion engine exhausts, industrial plant gases, e.g., enameling fumes, asphalt plant stack gases, and the like.

The catalytic compositions of this invention may also be used to enhance other reactions such as reduction reactions. These systems include the reduction of nitrogen oxides which may appear in, for instance, internal combustion engine exhaust or other effluent gases such as tail gases from nitric acid plants. Also, the catalysts may serve to promote both oxidation and reduction reactions simultaneously. Depending upon the catalytically-active, promoting metal components in the catalysts and the conditions of their use, the catalysts may thus serve to enhance the oxidation of hydrocarbons or carbon monoxide, while promoting the reduction of nitrogen oxides, to form less noxious materials such as carbon dioxide, nitrogen and water. The compositions of this invention may thus be so-called three-way catalysts for treating gases containing hydrocarbons, carbon monoxide and nitrogen oxides as in the case of internal combustion engine exhaust gases, to reduce pollution of the atmosphere. The simultaneous reduction of nitrogen oxides and oxidation of hydrocarbons and carbon monoxide may be conducted by using, for example, gaseous mixtures having a substantially stoichiometric ratio of molecular oxygen and fuel based on complete conversion to carbon dioxide and water.

One means of lowering the content of atmospheric pollutants in exhaust gases is by their contact with catalysts containing a catalytically-active, promoting metal component, especially a platinum group metal component. The catalysts are usually placed in the line leading from the source of the exhaust gases and serve to promote reaction between the polluting constituents of the gases and oxygen or hydrogen to convert the gases to less noxious materials. For example, the uncombusted and partially combusted fuel components in engine exhaust gases may be reacted with free oxygen, derived either from fuel-lean operation of the combustion zone or from an internal air or other oxygen supply. In any event, the provision of the catalysts does entail considerable expense. The catalysts generally contain minor amounts of one or more catalytically-active metal components which are susceptible to poisoning or deactivation of their catalytic activity through contact with materials such as lead, zinc, other metals, sulfur, phosphorus and other substances which are present in the exhaust or other gases with which the catalysts come in contact over long periods of use at elevated temperatures. Poisoning destroys, or materially reduces the length of, the useful life of the catalysts which in order to be economically feasible and otherwise conveniently employed, must be used successfully for extended times. For example, it is most desired, if not required, that automobile exhaust-treating catalysts operate satisfactorily for at least 50,000 miles of vehicle travel.

The poisoning of the activity of the catalysts may be due, for example, to materials containing sulfur which is a naturally-occurring component of many hydrocarbon fuels. Other sources of catalyst poisons are fuel additives such as the lead in octane number-enhancing materials added to gasoline, for example, tetraethyl or tetramethyl lead. Although in the United States there are restrictions on the amount of lead that may be added to gasolines, even the small amounts of lead permitted, or present from various contaminating sources, can cause undue poisoning of the catalysts over long periods of uses. Similarly, other fuel additives such as those containing phosphorus may lead to catalyst poisoning when exhaust gases derived from the oxidation of the fuel are contacted with the catalysts. Engine lubricating oils may be sources of catalyst poisons such as zinc, phosphorus or sulfate which ultimately may appear in the exhaust gases. Thus, to be satisfactory, the catalysts must be adequately resistant to the deleterious effects of these and other poisons.

By the present invention we have provided macrosize catalysts having good activity and catalytic stability, and increased resistance to poisoning from materials such as lead, zinc, other metals, sulfur or phosphorus with which the catalysts come in contact during use, for example, as described above. The macrosize catalysts contain a catalytically-effective amount of one or more catalytically-promoting metal components combined with a high surface area, catalytically-active, refractory oxide support carried on a relatively catalytically-inactive, solid material which is preferably a monolithic carrier having a plurality of fluid flow channels therethrough. According to the invention the macrosize catalysts have an aqueous solution of an alumina precursor applied to their surfaces to provide protection against the poisoning effects of various materials. The amount of the surface-applied alumina precursor is sufficient to increase the resistance of the catalysts to poisoning by one or more materials such as lead, zinc, other metals, sulfur, phosphorus and the like. Often the surface-applied alumina precursor comprises a minor amount, say about 0.5 to 20% ($Al_2O_3$ basis) of the total weight of the catalyst, and preferably this amount is about 2 to 10 percent. Apparently, the surface-applied alumina precursor when converted to alumina acts as a sink or trap for the catalyst poisons to prevent them from unduly reacting with the catalytically-promoting metal component, but yet the activity of the catalyst is not unduly adversely affected, if at all.

The compositions of this invention are made by contacting the macrosize, relatively inactive carrier bearing the catalytically-active, promoting metal-high area, support material, preferably after drying or calcination, with an aqueous solution of a precursor of alumina. Such solutions tend to penetrate the promoting metal-high area support material so that the precursor apparently becomes fairly evenly distributed in at least the peripheral portion of such material. There may, however, still remain a higher concentration of the precursor near the outer surfaces of the promoting metal-high area support material. The precursors may be, for example, water-soluble aluminum decomposable components such as aluminum salts, complexes, or other compounds or aluminum-containing materials, which can be dissolved in an aqueous medium for application to the catalyst. The aluminum component generally contains oxygen. The concentration of these solutions may vary considerably and may depend on various factors such as the amount of the aluminum component to be deposited and the absorptive properties of material being treated, but generally the solutions may be greater than about 50 percent saturated and are preferably substantially completely saturated to limit the amount of water added to the composition. The precursors can be formed into alumina, and it is preferred that the precursors be such that this conversion can be effected by decomposition during drying or calcination at elevated temperatures which are not so high as to unduly deleteriously affect the catalyst. The conversion of the precursor may take place while the catalyst is in use. A preferred precursor is aluminum sulfate which can be converted to alumina during use of the catalyst at elevated temperatures. When this occurs while the catalyst is employed in contact with gases containing lead components, the sulfate present may combine with the lead to form lead sulfate and thereby avoid or reduce lead poisoning of the promoting metal component of the catalyst.

The alumina precursor solution may contain minor amounts of other components such as precursors of rare earth oxides, e.g., ceria, silica and the like, and preferably such precursors are dissolved in the solution. The alumina precursor is preferably a major amount of the surface-applied material on a non-aqueous basis. Most desirably, the amount of alumina precursor is at least about 75% of the total weight on a non-aqueous basis. If other ingredients are added to the catalyst after the surface-applied alumina precursor component, it is preferred that they be essentially free of catalytically-active, promoting metal components, e.g., platinum group metals, or other promoters, of substantially greater catalytic activity than the catalytically-active alumina component derived from the surface-applied precursor solution.

In making the compositions of this invention the macrosize catalyst composite containing the catalytically-active promoting metal component and the high surface area support on the relatively inert carrier is usually dried, and is preferably calcined, say at temperatures of at least about 250° C., before contact with the alumina precursor solution. After application of the precursor solution, the catalytic composite is calcined, preferably at temperatures of at least about 250° C., and such calcination may occur during use of the catalyst. Calcination apparently serves to convert the alumina precursor to a catalytically-active alumina of, for instance, the types described herein for use as the refractory oxide support of the catalysts.

The catalytically-active promoting metal component of the catalysts of this invention may comprise one or more metals which may be in elemental or combined form as in the case of alloys, salts, oxides and the like. The metals are generally the heavy or transition metals of Groups III to VIII having an atomic weight of at least about 45. The metals include, for instance, the iron group metals, iron, nickel and cobalt; the metals of Groups VB and VIB, e.g., vanadium, chromium, molybdenum and tungsten; copper; zinc; manganese; rhenium; and combinations of such metals. The precious metals may also be in the catalysts as catalytically-active components, and it is quite preferred that one or more metals from the platinum group be present. The amount of promoting metal is generally a minor portion of the catalytic composite, and the amount is sufficient to provide a desired catalytically-promoting effect during the use of the catalyst. Such amounts may depend on the choice of metal and the intended use of the catalyst, and the amounts are generally at least about 0.01 weight % of the catalyst. These amounts may be up to about 30 or 40% or more, and preferably, the amounts are about 0.1 to 20%. In the case of the base or non-precious metals the amounts are frequently at least about 1% of the catalyst.

In the preferred catalysts of this invention, platinum group metal is present in the catalytically-active, promoting component in an amount sufficient to provide compositions having significantly enhanced catalytic activity due to the platinum group metal component. The useful platinum group metals include, for instance, platinum, ruthenium, palladium, iridium, and rhodium, and mixtures or alloys of such metals, e.g., platinum-palladium, platinum-rhodium, platinum-palladium-rhodium, may serve in the platinum group metal component of the catalysts. The amount of platinum group metal is a minor portion of the catalyst and generally does not materially exceed about 5 weight percent. For instance, the amount may be about 0.01 to 4% and is preferably about 0.03 to 1%. When the platinum group metal component of the catalysts contains more than one of such metals, this component may, for instance, be composed of a major amount of platinum and a minor amount of one or more of the other platinum group metals, e.g., one or both of palladium and rhodium. For example, this component of the catalyst may have about 55 to 98 weight % platinum and about 2 to 45 weight % of total platinum group metal other than platinum, e.g., total palladium and rhodium, based on the total of all of these metals. The platinum group metal may be present in the catalysts in elemental or combined forms, e.g., as an alloy, oxide, sulfide or the like. The foregoing amounts of the catalytically-promoting metals, whether they be base or precious metals, are stated on the basis of the metals regardless of their form.

Preferred platinum group metal-containing catalysts of this invention may contain both the platinum group metal component as aforedescribed and one or more base metal components. Such catalysts may be particularly useful in systems in which it is desired to conduct both oxidation and reduction simultaneously; for instance, to reduce nitrogen oxides while oxidizing carbon monoxide and hydrocarbons which may be present in the reaction system. The base metal component may be selected from those described above, and may particularly contain an iron group metal such as nickel, for instance, in oxide form. The amount of platinum group metal present may be as indicated above, while the base metal is often present in the catalyst in an amount greater than the platinum group metal, say at least about 0.5 weight % and up to about 20 weight % or more on an oxide basis. In such catalysts the weight ratio of base metal, oxide basis, to platinum group metal is generally at least about 2:1, preferably at least about 5:1, and preferably the catalysts contain more than one platinum group metal, particularly platinum plus one or more other platinum group metals, e.g., one or both of palladium and rhodium, in amounts indicated above.

The high area support with which the catalytically-active, promoting metal component is combined in the catalysts of this invention, is comprised of one or more refractory oxides. These oxides include, for example, silica and metal oxides such as alumina, including mixed oxide forms such as silica-alumina, aluminosilicates which may be amorphous or crystalline, alumina-zirconia, alumina-chromia, alumina-ceria and the like. Preferably, the support is composed to a major extent of alumina which especially includes the members of the gamma or activated alumina family, such as gamma and eta aluminas, and, if present, a minor amount of other refractory oxide, e.g., about 1 to 20 weight percent. The support materials which are in admixture with the catalytically-active, promoting metal component in the catalysts of this invention are often referred to as being in catalytically-active form, but such activity is of a low order compared with that of the catalytically-active, promoting metal components. The high surface area supports generally comprise a major amount of the combined weight of the support and catalytically-active, promoting metal. The surface area of the support is relatively high, usually at least about 25 square meters per gram as determined by the BET method, preferably at least about 100 square meters per gram.

The catalysts of this invention to which the alumina precursor solution is applied to impart the desired resistance to the effect of materials which would otherwise poison the catalysts to a greater extent, are in macrosize form. Generally, macrosize catalysts have minimum dimensions of at least about 1/16 inch, and often at least one or all dimensions are at least about ⅛ inch. The catalysts may be in particle form such as spheres, cubes, elongated pellets or the like, but preferably are in the form of monolithic or unitary structures having a plurality of gas flow paths through a single piece of catalyst.

The catalysts of the invention have a carrier component which is relatively catalytically-inert compared with the high surface area support, and the carrier is generally of considerably lower total surface area than the support which is applied thereto. Thus, the carrier may have a total surface area of less than about 5 or 10 square meters per gram, more often less than about 1 square meter per gram as determined by the BET method. The carrier may be in macrosize particle form before the more catalytically-active materials are added, and preferably the carrier is in monolithic form, e.g., a honeycomb configuration. The high area support material is generally distributed as a coating over most, if not all, of the surface of the carrier, and usually the high surface area support material is present in the catalysts in a minor amount based on the weight of the catalyst, say about 5 to 35, preferably about 10 to 30 weight percent. The carrier is generally the major amount of the catalyst.

The relatively inert carriers of the catalysts of this invention may be made of one or more of a variety of materials, but preferably are composed primarily of one or more refractory oxides or other ceramics or metals. The preferred carriers are comprised of cordierite, cordierite-alpha alumina, silicon nitride, zircon mullite, spodumene, alumina-silica-magnesia or zirconium silicate. Examples of other refractory ceramic materials utilizable in place of the preferred materials as a carrier are sillimanite, magnesium silicates, zircon, petalite, alpha-alumina and aluminosilicates. Although the carrier may be a glass ceramic, it is preferably unglazed and may be essentially entirely crystalline in form and marked by the absence of any significant amount of glassy or amorphous matrices, for instance of the type found in porcelain materials. Further, the structure may have considerable accessible porosity as distinguished from the substantially non-porous porcelain utilized for electrical applications, for instance in spark plugs, characterized by having relatively little accessible porosity. Thus, the carrier structure may have a water pore volume of at least about 10 weight percent. Such carriers are described, for example, in U.S. Pat. No. 3,565,830, herein incorporated by reference.

The monolithic carriers of the catalysts of this invention are of the type that have a plurality of passages through a single piece of the carrier. The passages are open to fluid flow and thus are not blocked or sealed against flow from an inlet to a separate outlet, and, accordingly, the passages are not merely surface pores. The passages are generally rather large compared with the size of surface pores in order that the fluids going through the passages are not subject to excessive pressure drop. The monolithic catalyst carriers have a unitary, skeletal structure of macrosize with a minimum cross-sectional dimension generally perpendicular to the direction of fluid flow therethrough of, for instance, at least about 2 centimeters, e.g., in honeycomb form, and have flow path lengths of at least about 5 centimeters preferably at least about 10 centimeters.

The flow passages of the monolithic carrier may be thin-walled channels providing a relatively large amount of superficial surface area. The channels can be one or more of a variety of cross-sectional shapes and sizes. The channels can be of the cross-sectional shape of, for example, a triangle, trapezoid, rectangle, polygon of more than four sides, square, sinusoid, oval or circle, so that cross-sections of the carrier represent a repeating pattern that can be described as a honeycomb, corrugated or lattice structure. The walls of the cellular channels are generally of a thickness necessary to provide a sufficiently strong unitary body, and the thickness will often fall in the range of about 2 to 25 mils. With this wall thickness, the structures may contain from about 100 to 2500 or more gas inlet openings for the flow channels per square inch of cross-section and a corresponding number of the gas flow channels, preferably about 150 to 500 gas inlets and flow channels per square inch. The open area of the cross-section may be in excess of about 60% of the total area.

The catalysts of this invention can be made by various suitable procedures. The catalytically-active, promoting metal component can be combined with the high area support in macrosize form on the carrier or in finely divided form with the mixture being subsequently deposited on the carrier. The catalytically-active, promoting metal component may be added as a solution, e.g., chloroplatinic acid, and the composite dried. The catalytically-active, promoting metal component may be fixed on the high area support, e.g., by treatment with hydrogen sulfide or by other means, and after fixing the catalytically-active, promoting metal component may be in water-insoluble form. During preparation or subsequent use of the catalysts, the catalytically-active, promoting metal component may be converted to elemental form by treatment with hydrogen-containing gas. Generally, the composited catalytically-active, promoting metal component and high area support on the carrier will be dried or calcined before the protective surface-applied alumina precursor solution is added, and preferably the composite is calcined prior to addition of the surface-applied alumina precursor. Calcination can be conducted at elevated temperatures, e.g., of the order of at least about 250° C., preferably at least about 475° C., but not so high as to destroy the high area of the support. After the surface- applied alumina precursor solution is added the catalysts may be dried, and are preferably calcined at temperatures of at least about 250° C. but not so high as to unduly destroy the surface area of the alumina formed from the precursor.

As stated above, the catalysts of the present invention can be employed to promote the oxidation or reduction of various chemical feedstocks or exhaust effluents, as noted above. Although such reactions may occur at relatively low temperatures, they are often conducted at elevated temperatures of, for instance, at least about 150° C., preferably about 200° to 900° C., and generally with the reactants in the vapor phase. The materials which are subject to oxidation generally contain carbon, and may, therefore, be termed carbonaceous, whether they are organic or inorganic in nature. The catalysts are thus useful in promoting, for example, the oxidation of hydrocarbons, oxygen-containing organic components, carbon monoxide, and the reduction of nitrogen oxides. These types of materials may be present in exhaust gases from the combustion of carbonaceous fuels, and the catalysts of the present invention are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The present invention will be illustrated further by the following examples. All parts and percentages are by weight unless otherwise indicated.

EXAMPLE I

A stabilized $CeO_2.Al_2O_3$ slip is prepared by dissolving 336 grams $Ce(NO_3)_3.6H_2O$ in 1188 ml. $H_2O$ for a final volume of solution of about 1390 ml. 1200 Grams of activated $Al_2O_3$ powder is stirred into the solution which is dried with constant agitation, transferred to a drying oven at 110° C., and dried for 17 hours. The dried solids are ground to less than 40 mesh (Tyler) and calcined at 1100° C. for 1 hour. 1000 Grams of this calcined powder are mixed with 1000 ml. $H_2O$ and 20.1 ml. conc. $HNO_3$, and ball-milled for 17 hours at 68 RPM in a U.S. Stoneware 1-gallon mill jar. 1000 Parts of the resulting slip are diluted with a solution of 3.3 parts conc. $HNO_3$ and 333 parts $H_2O$. A 3 cubic inch cordierite honeycomb having about 250 parallel gas passages per square inch of cross-sectional area, is dipped into this diluted slip, blown, with air, dried at 110° C. for 2 hours, and calcined at 500° C. for 2 hours. Approximately 15 wt. % of total ceria and alumina adheres to the honeycomb based on the weight of the latter. Platinum is deposited on the ceria and alumina-coated honeycomb by immersion in 500 ml. of aqueous $H_2PtCl_6$ (containing 2.41 g. Pt) for 30 minutes and then treated with $H_2S$ for 20 minutes. After being washed chloride free and dried, the honeycomb is heated in an air atmosphere for about 1 hour to reach 500° C. and then maintained at 500° C. for 2 hours.

EXAMPLE II

A composition of the present invention can be made by contacting the calcined, platinum-containing catalyst prepared essentially as described in Example I with an aqueous solution saturated with aluminum sulfate. The aluminum sulfate can be added to the platinum-containing catalyst by dipping the latter into the aluminum sulfate solution. The honeycomb is then withdrawn from the solution and blown with air. The resulting material is then dried at 110° C. for 2 hours and calcined at 500° C. for 2 hours. If necessary, the dipping, blowing, drying and calcining procedure can be repeated until the desired amount of alumina is added to the platinum-$CeO_2$. $Al_2O_3$-honeycomb catalyst.

EXAMPLE III

A catalyst of Example II (Catalyst A) was tested to show its resistance to lead poisoning and the performance of the catalyst was compared with that of a similar catalyst (Catalyst B) except that the latter catalyst did not have an aluminum sulfate solution applied to the platinum-$CeO_2.Al_2O_3$-honeycomb composite. In this test the efficiency of the catalyst for oxidizing CO and hydrocarbons in spark-ignition engine exhaust gases is determined by a standard test procedure using "lead-free" gasoline. Then the catalyst is used for the equivalent of 20 gallons of operation on leaded gasoline in a commercial vehicle, after which its performance is again evaluated by the standard test procedure. The results of these test procedures are reported in Table I.

TABLE I

| Catalyst | CO Conversion Efficiency %* | | | Hydrocarbon Conversion Efficiency %* | | |
|---|---|---|---|---|---|---|
| | Steady 30 | State 40 | MPH 50 | Steady 30 | State 40 | MPH 50 |
| A | 99.3 | 89.5 | 89.2 | 82.3 | 94.6 | 94.6 |
| B | 99.3 | 88 | 87.5 | 82.3 | 93 | 90 |

*% of catalyst performance before lead poisoning.

These tests show that Catalyst A of the present invention which had $Al_2O_3$ added as aluminum sulfate to the platinum-$CeO_2.Al_2O_3$-honeycomb catalyst in the manner described in Example II, exhibited a marked improvement in resistance to lead poisoning compared with the same catalyst having no aluminum sulfate added to the surface of the catalyst.

It is claimed:

1. In a process of preparing a catalytic composition the steps comprising depositing on the surface of a macrosize composite an aqueous solution having dissolved therein a major amount of an aluminum compound which is a precursor of catalytically-active alumina and a minor amount of a precursor of rare earth oxide, said amounts being on a non-aqueous basis, said composite consisting essentially of a catalytically-effective amount of catalytically-promoting metal, catalytically-active, refractory oxide support and a relatively catalytically-inactive carrier, the amount of said aluminum compound in solution in said aqueous solution deposited being sufficient to increase the resistance of the catalytic composition to poisoning by extraneous materials, and drying said composition subsequent to said deposition.

2. A process of claim 1 in which said carrier comprises a ceramic structure having fluid flow passages therethrough.

3. A process of claim 2 in which about 2 to 10 weight % ($Al_2O_3$ basis) of said catalytically-active alumina precursor is deposited on the catalytic composition.

4. A process of claim 2 in which said refractory oxide support comprises catalytically-active alumina.

5. A process of claim 2 in which said promoting metal comprises platinum group metal.

6. A process of claim 5 in which said refractory oxide support comprises catalytically-active alumina.

7. A process of claim 6 in which about 2 to 10 weight % ($Al_2O_3$ basis) of said catalytically-active alumina precursor is deposited on the catalytic composition.

8. A process of claim 7 in which said deposited catalytically-active, alumina precursor consists essentially of aluminum sulfate.

9. A process of claim 1 in which said deposited catalytically-active, alumina precursor consists essentially of aluminum sulfate.

10. A process in accordance with claim 1 in which said rare earth oxide comprises cerium oxide.

11. A catalytic composition consisting essentially of a macrosize composite of a catalytically-effective amount of catalytically-promoting metal and catalytically-active refractory oxide support on a relatively catalytically-inactive carrier, said macrosize composite having had deposited on the surface thereof an aqueous solution having dissolved therein a major amount of an aluminum compound which is a precursor of catalytically-active alumina and a minor amount of a precursor of rare earth oxide, said amounts being on a non-aqueous basis, said aluminum compound in said solution deposited being in an amount sufficient to increase the resistance of the catalyst to poisoning by extraneous materials.

12. A composition of claim 11 in which said carrier comprises a ceramic structure having fluid flow passages therethrough.

13. A composition of claim 12 in which said deposited catalytically-active alumina precursor is about 2 to 10 weight % ($Al_2O_3$ basis) of the catalytic composition.

14. A composition of claim 13 in which said refractory oxide support comprises catalytically-active alumina.

15. A composition of claim 13 in which said promoting metal comprises platinum group metal.

16. A composition of claim 15 in which said refractory oxide support comprises catalytically-active alumina.

17. A composition of claim 16 in which said deposited catalytically-active alumina precursor is about 2 to 10 weight % ($Al_2O_3$ basis) of the catalytic composition.

18. A composition of claim 17 in which said deposited catalytically-active alumina precursor consists essentially of aluminum sulfate.

19. A composition of claim 11 in which said deposited catalytically-active alumina precursor consists essentially of aluminum sulfate.

20. A catalyst in accordance with claim 11 in which said rare earth oxide comprises cerium oxide.

21. A catalyst according to claim 11 wherein the catalytic metal consists essentially of platinum, rhodium and nickel, said nickel being present in an amount greater than said platinum group metals.

22. A catalyst for purifying exhaust gas from vehicles which comprises a monolithic carrier having a plurality of exhaust gas passages penetrating through the carrier, a layer of catalytically-active alumina containing a catalytic metal of the platinum group deposited as a first layer on the inside surfaces of said plurality of passages, and further comprising catalytically-active alumina formed by depositing on said first layer an aqueous solution having dissolved therein a major amount of an aluminum compound which is a precursor of catalytically-active alumina and a minor amount of a precursor of rare earth oxide, said amounts being on a non-aqueous basis, said aqueous solution deposited having an amount of said aluminum compound sufficient to increase the resistance of the catalyst to poisoning by extraneous materials, said aqueous solution being free from said catalytic metal, and heating resulting aluminum and rare earth containing composite to form catalytically-active alumina and rare earth oxide.

23. A catalyst according to claim 22 wherein the catalytic metal comprises at least two metals of the platinum group elements.

24. A catalyst according to claim 22 including also at least one oxide of nickel, iron, cobalt, copper and chromium.

25. A catalyst according to claim 22 wherein about 0.01 to 40% by weight of the catalytic metal is contained in the first layer on the basis of the weight of the catalyst.

26. A catalyst according to claim 25 wherein the catalytic metal is platinum.

27. A catalyst according to claim 25 wherein the amount of the catalytically-active alumina deposited as an outermost layer is about 0.5 to 20 weight % of the catalyst.

28. A catalyst according to claim 22 wherein the catalyst metal is a mixture of platinum and ruthenium.

29. A catalyst according to claim 21 wherein the catalytic metal consists essentially of platinum, rhodium and nickel, said nickel being present in an amount greater than said platinum group metals.

30. A catalyst according to claim 22 wherein the catalytic metal is a mixture of platinum and another metal of the platinum group.

31. A catalyst according to claim 22 wherein the catalytic metal is a mixture of platinum and at least one oxide of nickel, iron, cobalt, copper or chromium.

32. A catalyst in accordance with claim 22 in which said rare earth oxide comprises cerium oxide.

* * * * *